United States Patent [11] 3,561,707

[72] Inventor William J. Strock
 Hartford, Conn.
[21] Appl. No. 836,005
[22] Filed June 24, 1969
[45] Patented Feb. 9, 1971
[73] Assignee United Aircraft Corporation
 East Hartford, Conn.
 a corporation of Delaware

[54] THRUST MOUNT
 6 Claims, 2 Drawing Figs.
[52] U.S. Cl. .................................................. 248/5,
 248/6
[51] Int. Cl. ........................................... B64c 1/14,
 B64d 27/16
[50] Field of Search ........................... 248/5, 6, 7,
 8, 14

[56] References Cited
 UNITED STATES PATENTS
 2,342,577 2/1944 Gehman ..................... 248/5
 2,400,248 5/1946 Morgan ..................... 248/5
 3,006,587 10/1961 Jumelle et al. ............. 248/5

Primary Examiner—Roy D. Frazier
Assistant Examiner—William H. Schultz
Attorney—Jack N. McCarthy ABSTRACT: A thrust mount construction for transmitting thrust developed in an engine to an airframe structural member. A thrust boss on the engine cooperates with a thrust bracket and transmits the thrust thereto. The thrust bracket in turn transmits the thrust to the airframe structural member.

PATENTED FEB 9 1971

3,561,707

INVENTOR
WILLIAM J. STROCK
BY James J. Kane
AGENT

3,561,707

THRUST MOUNT

BACKGROUND OF THE INVENTION

This invention relates to a thrust mount construction and more particularly to a device for transmitting the thrust developed in a gas turbine engine to an airframe mount structure.

Both the gas turbine engine and the aircraft, for which they provide the propulsive thrust, as a result of the relative high propulsive thrust generated and speed requirements are subjected to extreme stresses due to aerodynamic loading, and stresses induced by differential thermal expansion and load deformations of the engine structure relative to the airframe. The prior art constructions to transmit these thrust loads from the engines to an airframe structural member have been primarily a rod and yoke connection or turn buckle mechanism. However, some of the prior art constructions have utilized an integral bearing mechanism.

The basic objection to the prior art mounting constructions is that they are generally extremely complex, costly and a relatively heavy device. Additionally, it has often been found necessary to build up or strengthen the engine casings in the area of the thrust mount. Obviously, this is another weight and cost penalty which is not desirable.

SUMMARY OF THE INVENTION

It is a primary object of this invention to provide a thrust mount construction for transmitting the thrust developed in a gas turbine engine to an aircraft structural member that is of a relatively light, simple and low-cost construction.

In accordance with this invention, the thrust mount construction consists of a boss which may be integral with or connected to an engine casing. Positioned on either side of the boss and extending outwardly from the casing is a flange, the flanges forming a circumferential groove around the casing. Positioned within the flanges and supported therefrom is a thrust bracket. The thrust bracket contains a pair of projections or fingers which straddle the boss and it is through the boss and fingers that thrust developed in the engine is transmitted to the thrust bracket. Positioned within the thrust bracket and cooperating therewith is an airframe structural member, to which the developed engine loading is transmitted.

To accommodate and eliminate any binding due to misalignment between the airframe and engine, a bearing construction, herein illustrated as a spherical bearing, is utilized. The bearing is positioned within the thrust bracket, and the airframe structural member is positioned within the bearing. Additionally, the present invention utilizes a bushing construction in supporting the thrust bracket from the flanges to resist and transfer any couple or moments developed in the thrust bracket.

DESCRIPTION OF THE PREFERRED EMBODIMENT

Figure 1:
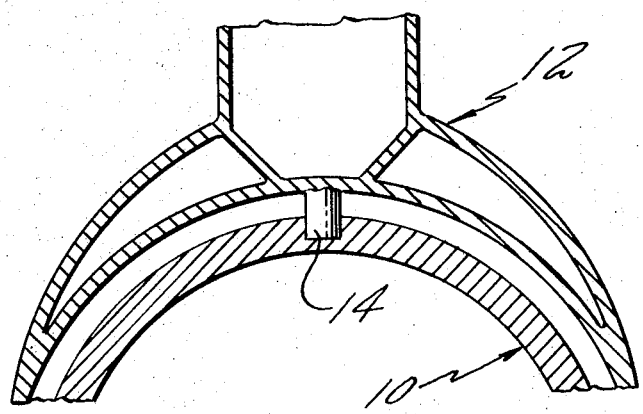
FIG. 1 is a diagrammatic showing of a portion of the airframe structure and the thrust mount.

The device of the invention is illustrated generally in FIG. 1 wherein engine 10 is suspended from an airframe nacelle 12. It should be borne in mind that this embodiment is illustrative only and that the engine may be suspended or supported from any appropriate portion of the airframe by any conventional method. For the sake of brevity and convenience the engine 10 is shown suspended from only one pin 14; however, it should be clear that any number and shape structural member may be utilized.

Figure 2:
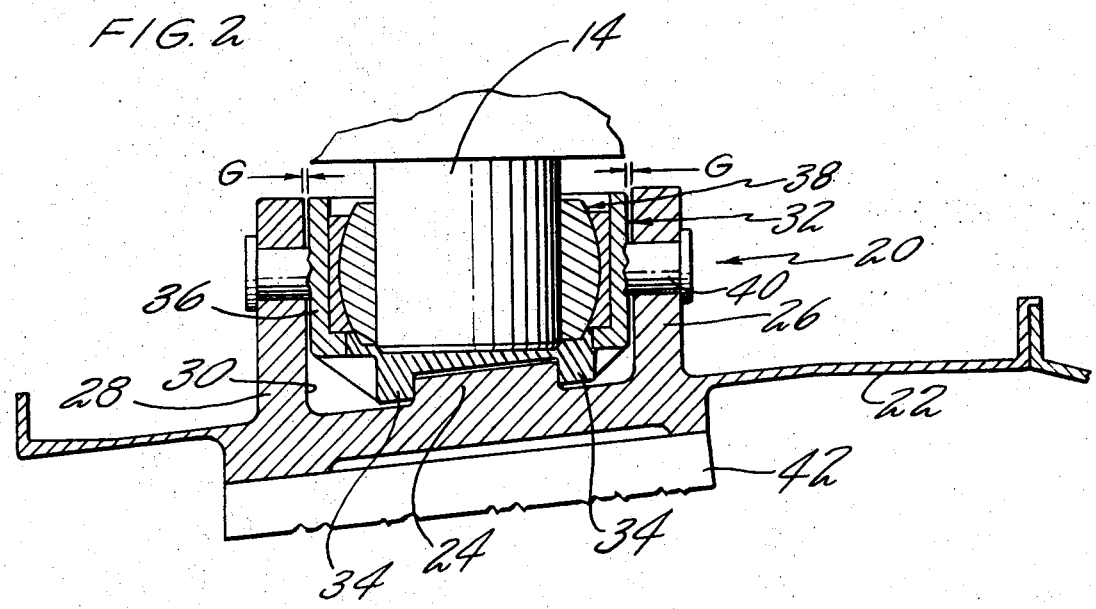
FIG. 2 is an enlarged cross-sectional illustration of the thrust mount construction.

Referring to FIG. 2 an enlarged cross-sectional illustration of thrust mount 20 is shown. Positioned on engine casing 22 is boss or thrust boss 24. Boss 24 is herein illustrated as being integral with casing 22. However, boss 24 may be any type projection which is secured to casing 22 by any conventional means. Extending outwardly from casing 22 are flanges or projections 26 and 28. Flanges 26 and 28 are spaced from one another and thereby form circumferential groove 30 therebetween. Flanges 26 and 28 are positioned on casing 22 such that boss 24 is contained therebetween and hence in circumferential groove 30.

Supported from flanges 26 and 28 and also positioned within circumferential groove 30 is thrust bracket 32. Thrust bracket 32 has a plurality of inwardly extending projections or fingers 34 which straddle boss 24. More specifically at least one finger 34 is positioned on the upstream and downstream sides of boss 24. It is through these fingers 34 that the thrust developed in the engine is transmitted to the airframe structural member 14. More particularly the thrust developed in the engine is transmitted from casing 20, through boss 24 to fingers 34 and hence to the main body 36 of bracket 32. The thrust is thereafter transmitted to structural pin 14, only a portion of which is shown in FIG. 2.

Pin 14 is positioned within bearing means 38, bearing means 38 herein being illustrated as a spherical bearing. Spherical bearing 38 is carried by thrust bracket 32, and serves the purpose of eliminating any binding due to misalignment between the airframe and the engine.

When thrust bracket 32 is positioned within circumferential groove 30, a small gap "G" exists between the thrust bracket 32 and the flanges 26 and 28. As a result a kick load or a couple is developed in construction, and this couple is resisted by a plurality of bushings 40, which are pressed into flanges 26 and 28 and thrust bracket 32. Bushings 40 not only support thrust bracket 32 from flanges 26 and 28 but they transfer the couple produced to aerodynamic strut 42 which additionally serves as a flexure member.

I claim:

1. An engine thrust mount construction for transmitting thrust from the engine to an airframe structural member comprising:
   an engine casing;
   a pair of flanges connected to the engine casing, the flanges being spaced from one another and forming a circumferential groove therebetween;
   a boss connected to the engine casing, the boss being positioned within the circumferential groove;
   a thrust bracket positioned within the circumferential groove, the thrust bracket cooperating with the boss and the airframe structural member to transmit the thrust from the engine to the airframe structural member; and
   the thrust bracket including a pair of flanges spaced axially from one another, these flanges straddling the boss and the thrust bracket including means for eliminating any binding due to misalignment between the structural member and the engine.

2. An engine thrust mount construction as in claim 1 wherein the means is a spherical bearing, the structural member being positioned within an internal opening in the bearing and cooperating therewith and the thrust bracket is positioned around the bearing and cooperating therewith.

3. A device for mounting a gas turbine engine in an aircraft installation comprising:
   An engine casing having an integral thrust flange extending outwardly therefrom;
   a pair of outwardly extending projections connected to the casing, the projections being spaced from one another to form a circumferential slot within which the thrust flange is positioned;
   a thrust bracket positioned within the circumferential slot and connected to the outward projections, the thrust bracket including means for transmitting the thrust loads from the thrust flange to a structural member of the aircraft; and
   bearing means mounted on the bracket to eliminate any misalignment between the engine and its structural member.

4. A device for mounting an engine as in claim 3 wherein the means for transmitting the thrust loads from the thrust flange to the thrust bracket comprise a pair of inwardly extending fingers, the fingers being spaced from one another and being positioned on opposite sides of the thrust flange.

5. A device for mounting an engine as in claim 3 wherein the thrust bracket is positioned between the projections so that a gap exists therebetween, and the thrust bracket is supported from the projections by a plurality of pins, the pins transmitting any couple-type loads produced in the thrust bracket to an engine structural member.

6. A device for mounting an engine as in claim 5 wherein the bearing means is a spherical bearing, the aircraft structural member is a pin structure one end of which is connected to the aircraft and the other end is positioned within the spherical bearing and the thrust bracket is positioned around the spherical bearing.